UNITED STATES PATENT OFFICE.

ARNOLD OTTO BLICKLE, OF FRANKFORT-ON-THE-MAIN, GERMANY, ASSIGNOR TO THE CORPORATION OF METALLBANK UND METALLURGISCHE GESELLSCHAFT A. G., OF FRANKFORT-ON-THE-MAIN, GERMANY.

PROCESS FOR THE RECOVERY OF METAL OXIDS AND HYDROXIDS.

1,175,587.  Specification of Letters Patent.  Patented Mar. 14, 1916.

No Drawing.  Application filed September 24, 1913.  Serial No. 791,563.

*To all whom it may concern:*

Be it known that I, ARNOLD OTTO BLICKLE, diploma'd engineer, a citizen of Germany, residing at Frankfort-on-the-Main, in the German Empire, have invented certain new and useful Improvements in Processes for the Recovery of Metal Oxids and Hydroxids, of which the following is a specification.

The present invention relates to the recovery of metal oxids and hydroxids and in particular to a process for transforming basic precipitates of salts obtained by precipitation of metal salt solutions with basic substances into practically pure oxids or hydroxids, which process also permits of a separation of several metals. For this purpose according to the present invention basic salt precipitates obtained by precipitating metal salt solutions with basic substances in quantities substantially equivalent to the metal content of the solution are heated to a moderate temperature, that is to say, to a temperature below the boiling point of the salts and the residue is then lixiviated. The heating may also be carried out in an autoclave in the presence of water, in which case of course the salts formed are dissolved.

As an example it has been shown that the recovery of oxids or hydroxids of copper and zinc which are practically free from chlorin, can be carried out in the following manner: To a solution of copper and zinc chlorid there is added a quantity of burnt lime which is substantially equivalent to its content in metal, whereby the copper and zinc are precipitated in the form of the well-known green precipitate containing a good amount of chlorids and of course also containing unused lime. The filtered precipitate is now dried and heated to a moderate temperature, below the boiling point of the chlorids, for instance at 500° centigrade. This heating can be carried out in the open or in closed vessels; and the heating means may consist of hot gases or superheated steam. It will be seen that first water is given off and that afterward the color of the precipitate changes from green to gray. A splitting up of the oxy-chlorids takes place, that is to say, water is separated and free oxids or hydroxids and free chlorids are formed. The product thus obtained is now lixiviated with water when the chlorids, and principally calcium chlorid, go into solution. The residue is practically free from chlorin.

In using the same principle of the process it is also possible to attain a practically complete separation of copper from zinc from their solution. For this purpose to the copper-zinc solution a quantity equivalent only to its content in copper of for example burnt lime or carbonate of lime is added. The precipitate containing chlorin thus obtained not only contains the whole of the copper but also a considerable amount of zinc. After filtering off, this precipitate is heated as above described, when the oxy-chlorids are decomposed and copper chlorid enters into reaction with zinc oxid and lime which may be present to form copper oxid, zinc chlorid, and calcium chlorid. By treatment with water the chlorid may be lixiviated out from the products and practically pure copper oxid remains. The dissolved zinc is then obtained practically free from chlorin by precipitation with lime and treatment as above described.

It will be obvious that in place of lime other basic substances can be employed for the precipitation of the metals; for instance, copper may be precipitated with zinc oxid. Likewise, it is not necessary to start with a chlorid solution, other salt solutions, such for instance as solutions of sulfates being capable of being treated in the same manner.

As stated above, to a solution of metal salts is added a quantity of basic substances which is substantially equivalent to its metal content. Such determined quantity of basic substances is required for the conversion of the basic salts into oxids which is done after precipitation. For the precipitation itself a smaller quantity of basic substances will do, as the metal precipitate is a basic salt. Hence it is not necessary to add during the operation of precipitation the whole equivalent quantity of basic substances, but only such an amount as required for perfect precipitation of the desired metal or metals. For the conversion of the basic salts into oxids there is then added to the basic salt precipitate such a further amount of basic substances, that, together with the amount already used for the precipitation, the equivalent of the whole metal content of the precipitate, or of one of its metals is attained.

What I claim is:

1. The process of recovering metal oxids and hydroxids from metal salt solutions which comprises treating such solutions with basic substances in amount sufficient to form basic salt precipitates, heating the basic precipitates with basic substances substantially equivalent to the amount of metal to be separated, to a moderate temperature, below the boiling point of the salts, and then lixiviating the residues.

2. The process of effecting a selective recovery of metal oxids and hydroxids from metal salt solutions which comprises treating such solutions with basic substances in amount not exceeding the equivalent of the metal to be separated and thereby forming a basic salt precipitate, heating the precipitate with an amount of basic substances substantially equivalent to the particular metal or metals to be separated, to a moderate temperature, below the boiling point of the salt, and thereby effecting the conversion of such metal or metals into oxids and hydroxids, and lixiviating the residues for the recovery of the desired metal compounds in a substantially pure state.

3. The process of recovering metal oxids and hydroxids from metal salt solutions, which comprises treating such solutions with small amounts of basic substances just sufficient for precipitating the metal content to be separated and thereby forming a basic salt precipitate, heating the basic precipitate with further amounts of basic substances sufficient to form, with the basic substances previously added, the equivalent of the metal to be separated, to a moderate temperature, below the boiling point of the salts, and then lixiviating the residues.

4. The method of effecting a selective recovery of metal oxids and hydroxids from metal salt solutions, which comprises treating such solutions with a small amount of basic substances just sufficient to precipitate one or more of the metals of the solution and thereby forming basic salt precipitates of such metal or metals, heating the basic precipitates with further amounts of basic substances sufficient to form, with the basic substances previously added, the substantial equivalent of the metal or metals to be separated, to a moderate temperature, below the boiling point of the salts, and thereby effecting substantially complete conversion of said metal or metals into their oxids and hydroxids, and then lixiviating the residues for the recovery of the desired metal compounds in a substantially pure state.

5. The process of recovering metal oxids and hydroxids from metal chlorid solutions, which comprises treating such solutions with basic substances in amount sufficient to form basic chlorid precipitates, heating the basic precipitates with basic substances substantially equivalent to the amount of metal to be separated, to a moderate temperature, below the boiling point of the salts, and then lixiviating the residues.

In testimony whereof, I affix my signature in the presence of two subscribing witnesses.

ARNOLD OTTO BLICKLE.

Witnesses:
ROBERT ENGLER,
JEAN GRUND.